United States Patent [19]

Rowe

[11] Patent Number: 4,640,042
[45] Date of Patent: Feb. 3, 1987

[54] FISHING LURE

[76] Inventor: Lacy A. Rowe, 1851 Skycoe Dr., Salem, Va. 24153

[21] Appl. No.: 832,894

[22] Filed: Feb. 26, 1986

Related U.S. Application Data

[63] Continuation-in-part of Ser. No. 596,381, Apr. 3, 1984, Pat. No. 4,573,282.

[51] Int. Cl.$^4$ ............................................. A01K 85/00
[52] U.S. Cl. ................................................... 43/42.15
[58] Field of Search ................. 43/42.15, 42.03, 42.11, 43/42.02

[56] References Cited

U.S. PATENT DOCUMENTS

| | | | |
|---|---|---|---|
| 974,050 | 10/1910 | Garrison | 43/26.2 |
| 1,499,819 | 7/1924 | Goble | 43/42.15 |
| 1,540,702 | 6/1925 | Morriss | 43/42.15 |
| 1,581,833 | 4/1926 | Bonnett | 43/42.15 |
| 1,786,568 | 12/1930 | Kutz | 43/42.1 |
| 1,828,574 | 10/1931 | Neukam | 43/42.15 |
| 2,244,032 | 6/1941 | Timm | 43/26.2 |
| 2,535,392 | 12/1950 | Dale | 43/42.13 |
| 2,556,533 | 6/1951 | Graaten | 43/42.15 |
| 2,674,060 | 4/1954 | Simmons | 43/42.15 |
| 2,789,385 | 4/1957 | Seeger | 43/42.15 |
| 2,984,928 | 5/1961 | Jenkins | 43/42.15 |

Primary Examiner—Gene P. Crosby
Attorney, Agent, or Firm—Munson H. Lane, Jr.

[57] ABSTRACT

An improved articulated fishing lure is comprised of at least a front section and a tail section which are symmetrical about a longitudinal vertical plane of symmetry and are connected with minimum longitudinal separation between sections for oscillation of the tail section relative to the front section to simulate the action of an injured minnow. A cupped cavity is provided in the front end of the tail section and the axis of articulation of the tail section relative to the front section lies in the longitudinal vertical plane of symmetry rearward of the cupped cavity and forward of the centroid of the tail section. Upper and lower bracket arms which overlie and underlie respectively the front portion of the tail section are mounted on and extend rearwardly from the rear end of the front section. The bracket arms support a pivot which extends through the tail section along the axis of articulation. The axis of articulation in one embodiment is normal to the longitudinal axis of the tail section and in another embodiment is inclined upwardly and forwardly relative to a plane including the front end surface of the tail section.

13 Claims, 11 Drawing Figures

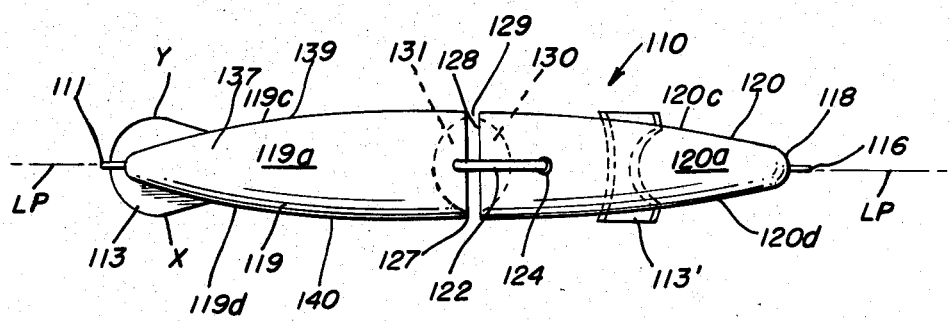
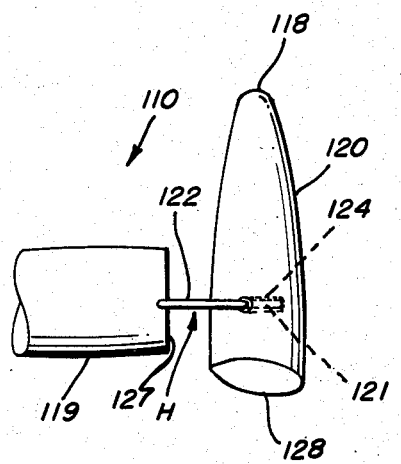
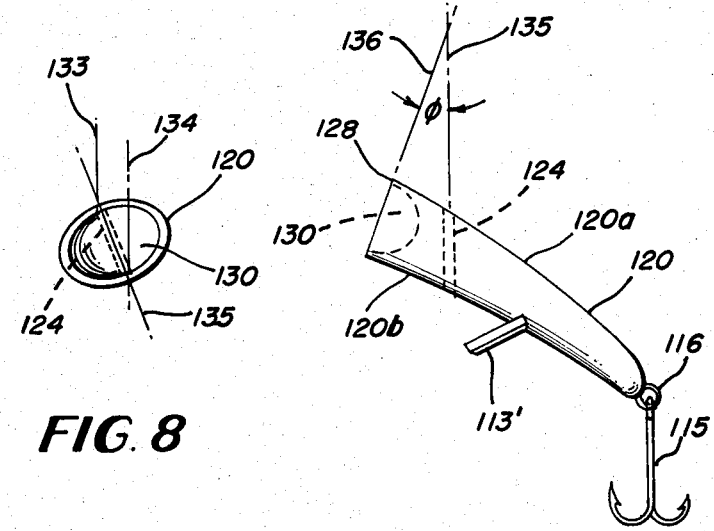
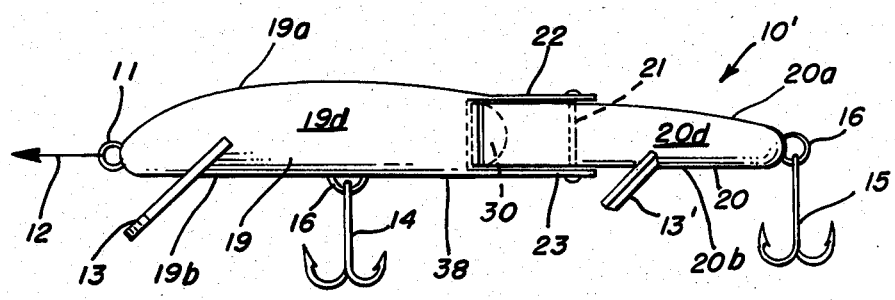
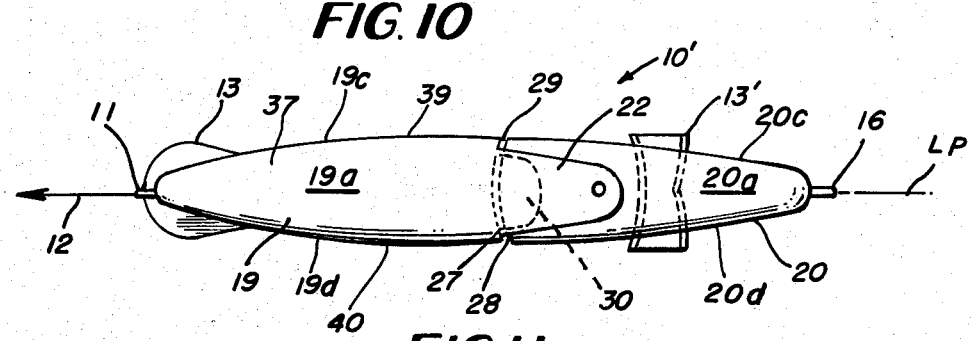

FISHING LURE

CROSS REFERENCE TO RELATION APPLICATION

This application is a continuation-in-part application of my application Ser. No. 596,381 filed Apr. 3, 1984 for Fishing Lure, now U.S. Pat. No. 4,573,282. The entire disclosure of application Ser. No. 596,381 is hereby incorporated by reference as a part of the disclosure of the present application.

BACKGROUND OF THE INVENTION

1. Field of Invention

This invention relates in general to fishing lures and more particularly to fishing lures comprised of at least front and tail sections which are articulated in such a way that when the lure is pulled through water, the tail section will oscillate relative to the front section in a manner simulating the action of an injured minnow.

The action of an injured minnow as it moves through water includes a large amount of tail action relative to its forward motion. A fish observing the motion of the injured minnow recognizes it as easy prey and will attack it. It is therefore an object of this invention to provide a fishing lure which will simulate as close as possible the action of an injured minnow.

2. Discussion of the Prior Art

There are many articulated fishing lures disclosed in the patent literature, however, none of which applicant is aware discloses a fishing lure having the improved features of the present invention which are described and claimed herein.

The present invention is an improvment upon the fishing lures disclosed in my aforesaid patent application Ser. No. 596,381, U.S. Pat. No. 4,573,282.

SUMMARY OF THE INVENTION

The desired action of the fishing lure of the present invention is to display a disproportionate high amount of energy expended by the tail per unit of thrust forward, thereby, simulating a minnow in distress which would be an easy catch for a fish seeking a meal. Not many fish waste their time chasing a healthy efficient minnow. The desired action achieved by the improved fishing lures of this invention is that the tail section of the lure having articulated front and tail body sections is no longer positively tracking the front section. Rather, it sweeps from side to side with a wider sweep angle than does the fishing lure disclosed in my aforesaid patent application Ser. No. 596,381, U.S. Pat. No. 4,573,282, whereby optimum inefficiency is displayed per unit of forward motion, thus simulating an easy prey.

I have found that by carefully selecting (tuning) the lengths of the front and tail sections of the articulated fishing lure and the position of the hinge for the tail section, that the oscillation (side to side motion) frequency can be built in such that the rear section will oscillate faster than the front section, which is very favorable to the desired action of the lure. The variables to be tuned are: the length ratio between the lengths $L_1$ and $L_2$ of the front and rear sections of the lure, the mass weight distribution and the cooperating shape of the cup in the front end of the tail section to induce a pulsing force F with timeliness on the tail section.

By proper tuning, it is believed possible to achieve a frequency ratio of tail section oscillation to front section oscillation of two to one.

In the fishing lures of the present invention, the mechanical hinging of the lure body sections has been improved over the hinging mechanism of the fishing lures disclosed in my aforesaid patent application Ser. No. 596,381, U.S. Pat. No. 4,573,282, resulting in less binding due to a small amount of rotation of the lure induced by a front lip projecting forwardly from the bottom of the lure as well as by the primary side to side motion of the lure.

In all of the embodiments of the present invention, the pivot axis for the tail section of the lure lies in the vertical longitudinal plane of symmetry for the lure forward of the tail section centroid and rearward of a cupped cavity extending inwardly from the front end of the tail section. The pivot is supported by upper and lower bracket arms secured to the rear end of the front body section of the lure and extending rearwardly therefrom. The front end portion of the tail section swings about the pivot between the upper and lower bracket arms. The adjacent ends of the front and tail body sections are spaced apart and shaped in such a way as to permit slight clearance between the two sections as they swing relative to each other.

In one embodiment of the invention, the pivot axis is prependicular to the longitudinal axis of the tail section.

In another embodiment of the invention, the pivot axis is inclined relative to the longitudinal axis of the tail section upwardly and forwardly toward a plane including the front end surface of the tail body section so that the tail body section rolls about its longitudinal axis when it swings from side to side.

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which:

FIG. 6 is a top plan view of the fishing lure shown in FIG. 5;

FIG. 7 is a partial top plan view of the fishing lure shown in FIG. 5 showing the tail section pivoted out of alignment with the front section;

FIG. 8 is a front end view of the tail section shown in FIG. 7 illustrating how the tail section rotates counter clockwise about its longitudinal axis when it is pivoted counter clockwise about its inclined pivot axis;

FIG. 9 is a side elevational view of the tail section of the fishing lure shown in FIG. 5 showing the natural position the tail section would take when supported in water as a result of non-uniform distribution of weight along its length;

FIG. 10 is a side elevational view of a modification of the fishing lure embodiment shown in FIGS. 1-4;

FIG. 11 is a top plan view of the lure shown in FIG. 10.

DETAILED DESCRIPTION OF THE PREFERRED EMBODIMENTS

Figure 1:
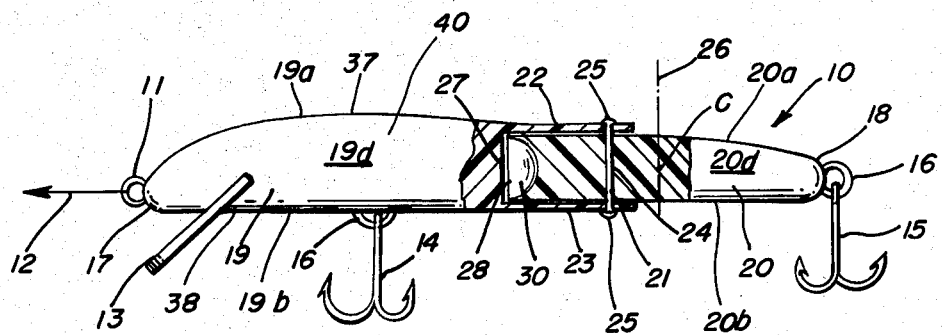
FIG. 1 is a side elevational view, partly in longitudinal section, of one form of the fishing lure of this invention showing the general construction thereof.
Figures 2, 3:
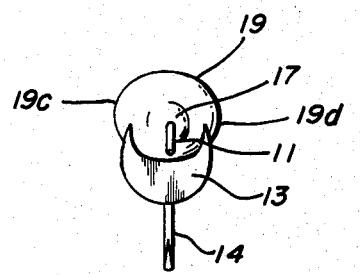
FIG. 2 is a front end view of the fishing lure of FIG. 1.
FIG. 3 is a rear end view of the fishing lure of FIG. 1.

Referring to the drawings, and particularly to FIGS. 1 to 4, one embodiment of the improved articulated fishing lure of this invention is generally indicated by the numeral 10. The fishing lure 10 is generally shaped to simulate a minnow and has the usual appendages common to conventional fishing lures including an attaching eye 11 at the nose of the lure for the attachment of a fishing line, or leader 12, a baffle 13 inset in the bottom front portion of the lure and inclined in a downward and forward direction, and a pair of fish hooks 14 and 15 connected by eyelets 16 to the bottom of the lure and to the trailing end of the lure respectively.

The overall shape of the lure as seen from a top view (shown in FIG. 2) is generally elliptical with side edges curved smoothly from an area of maximum body width just forward of the mid section toward narrow front and tail ends 17 and 18 respectively. The lure 10 has front and tail sections 19 and 20 which are articulated by a pivot pin 21 extending vertically through top and bottom rearward bracket arm extensions of the front section 19, or ears 22 and 23 respectively, and through a vertical bore 24 in the tail section 20. The ends of the pivot pin 21 are swaged, as shown at 25, to secure the pivot pin in place. Low friction washers (not shown) are preferably positioned on the pivot pin 21 between the body of tail section 20 and the ears 22 and 23. The ears 22 and 23 are spaced apart sufficiently to permit the front end of the tail section 20 to swing freely between them.

The lure 10, and other lures disclosed herein, are substantially symmetrical, when their body sections are in alignment, about a vertical longitudinal plane of symmetry including the longitudinal axis of the lure, and each lure section is also generally symmetrical about a vertical longitudinal plane of symmetry including the longitudinal axis of the respective body section.

Figure 4:
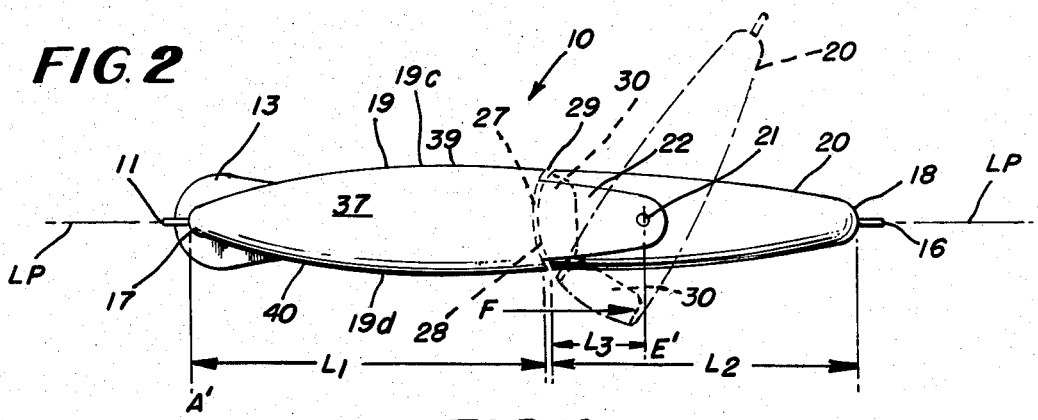
FIG. 4 is a top plan view of the fishing lure of FIG. 1 showing in solid lines the front and tail sections of the lure in alignment and showing in dotted lines the angled relationship of the tail section relative to the front section in one phase of oscillation resulting from forces acting on the lure as it is pulled through water by a line attached to the nose of the front section.

As shown by dotted lines in FIG. 4, the surface 27 of the rear end of the front section 19 between the ears 22, 23 is arcuate and complementary to the arcuate front surface 28 of the tail section 20. The surfaces 27 and 28 are spaced slightly apart by a gap 29 sufficient to provide clearance therebetween as the tail section pivots relative to the front section. A cupped cavity 30, substantially concentric and symmetrical with the longitudinal axis of the tail section 20, extends inwardly from the front surface 28 of the tail section to provide a reaction surface against which water flowing past the lure 10, as it is pulled through a body of water, acts in a manner to be described.

The vertical line 26 shown in FIG. 1 represents a vertical axis through the centroid of the tail section 20. The axis of pivot pin 21 is perpendicular to the longitudinal axis of the tail section 20 and is located forward of the vertical axis 26 through the centroid and substantially rearward of the cupped cavity 30.

As observed in FIGS. 1 and 4, the tail section 20 continues the rearward tapered contour of the rear end of the front section 19 without any offset. Each of the lure sections 19 and 20 are preferably made of solid material, such as plastic or other suitable material having the desired buoyancy.

The lure 10 differs from the lure disclosed in FIGS. 1-4 of my aforesaid patent application Ser. No. 596,381, U.S. Pat. No. 4,573,282 primarily in the way the front and rear sections of the two lures are hinged. In lure 10 of the present invention, the upper and lower ears (bracket arms) 22 and 23 extending rearwardly from the front section and having vertically aligned bores therein for pivotal engagement with the pivot pin 21 extending through the tail section 20 provides more efficient articulation than the lure of my aforesaid patent application. The more efficient articulation results because there is less binding due to a small amount of rotation of the lure being induced by the front lip 13 as well as the primary side-to-side oscillating motion of the tail section relative to the front section.

The location of the pivot pin 21 forward of the vertical axis 26 through the rear section centroid and rearward of the cavity 30 corresponds substantially with the location of the pivot pin of the lure disclosed in my application Ser. No. 596,381, U.S. Pat. No. 4,573,282. The swinging action of the tail section 20 relative to the front section 19 as the lure is pulled through water corresponds closely with the swinging action of the lure described in my aforesaid patent application except that the lure 10 of this invention is confined by the hinge mechanism to swing in a single plane whereas the lure of application Ser. No. 596,381, U.S. Pat. No. 4,573,282 is not confined to swing in a single plane because of the loose fit of the eye of the single drawbar about its hinge pin. The bracket arms 22 and 23 of lure 10 are equivalent to a pair of parallel drawbars as distinguished from the single drawbar connecting the sections of the lures of my aforesaid application.

In FIGS. 10-11, a lure 10' is illustrated which is similar to the lure 10 of FIGS. 1-4 with the exception that a bottom lip or baffle 13' has been added to the tail section 20 rearward of the pivot 21. The rear lip 13' has been added to provide further self-induced articulation of the rear section 20 relative to the front section 19. A rear lip, without the pivot axis of the pivot pin 21 being substantially to the rear of the front end of the tail section, will impede articulation, not assist same, except in a very slow top of water retrieval mode. The combination of the lip 13' and cupped cavity on the front of the rear section 20 cooperatively assists to cause favorable articulation at any speed of retrieval on top of the water or under water.

Another embodiment 110 of the fishing lure of this invention is illustrated in FIGS. 5-9. The fishing lure 110 comprises front and tail sections 119 and 120 which are connected by hinge means H comprising a wire rod bent to form upper and lower substantially parallel bracket arms 122 and 123 extending rearwardly of the front section 119 and a pivot portion 121 integrally connected to the rear ends of the bracket arms 122 and 123. The inclined forward end portions 122' and 123' of the bracket arms 122 and 123 respectively are secured in the body of the front section 119 adjacent to the rear end thereof, the end portion 122' being inclined downwardly and forwardly from the top of the lure section 119 and the end portion 123' being inclined upwardly and forwardly from the bottom of the lure section 119.

The end portions 122', 123', bracket arms 122 and 123 and pivot member 121 are formed to lie in a common plane and are secured to the lure sections 119 and 120 so that the common plane in which they lie coincides with a vertical plane extending through the longitudinal axis of the lure. The lower bracket arm 123 is longer than the upper bracket arm 122 so that the pivot portion 121 which joins the ends of the arms 122 and 123 is inclined relative to the bracket arms. The pivot portion 121 is pivotally mounted in a bore 124 extending through the tail section 120. The bore 124 is located in the aforesaid vertical plane extending through the longitudinal axis of the lure at a position rearward of the front end surface 128 of the tail section and forward of a vertical axis through the centroid of the tail section represented by the line 126. A bearing sleeve or bushing (not shown) may be positioned in the bore 124 as a liner, if needed, to reduce friction and possible binding of the pivot portion 121 in the bore as the tail section swings relative to the front section. Instead of a bearing sleeve or bushing, a lubricating coating may be applied to the pivot portion 121 or to the inner surface of the bore 124 as needed. The longitudinal axis 135 of pivot portion 121 makes an angle $\phi$ with a vertical line 136 in the front end surface 128 of the tail section 120 which is perpendicular to the longitudinal axis of the lure 110.

A cupped cavity 130 extends longitudinally inwardly from the front end surface 128 of the tail section 120, and a cupped cavity 131 extends longitudinally inwardly from the rear end surface 127 of the front section 119. The cavity 131 is of a size and shape to provide sufficient clearance between the front of the tail section and the rear of the front section for the tail section to swing freely about pivot portion 121. The cavity 130 provides a reaction surface reacting to the force of water through which the lure 110 is pulled. A small gap 129 normally separates the front and tail sections 119 and 120 respectively when they are aligned.

The lure 110 has a front eyelet 111 fixed in the front end 117 of the front section 119 to which a line (not shown) may be attached and an eyelet 116 fixed in the rear end 118 of the tail section 120 to which a fishhook 115 is attached. Another eyelet 116 is provided beneath the front section 119 for the attachment of a bottom fishhook 114. A pair of baffles or lips 113 and 113' are secured in slots provided in the bottom of the front and tail sections respectively, each being angled downwardly and forwardly. The front lip 113 extends forwardly under the front end 117. The rear lip 113' is positioned rearwardly of the pivot portion 121.

FIGS. 7 and 8 illustrate the manner in which the tail section 120 of the lure 110 rolls counterclockwise as the tail section swings counterclockwise about the inclined pivot portion 121 within the bore 124 of the tail section. When the tail section swings clockwise about the pivot portion 121, the roll will be in a clockwise direction.

In FIG. 8, the lines 133 and 134 represent vertical lines through the top and bottom points on the surface of the lure tail section through which the longitudinal axis 135 of the pivot portion 121 passes. When the tail section and front section are aligned, the lines 133 and 134 as seen from the front of the tail section would coincide.

FIG. 9 is illustrative of the position the tail section 120 would assume, if separated from the front section 119 and allowed to remain at rest in a body of water. The distribution of weight of the tail section and of its appendages would tilt the tail section to the position shown where axis line 135 through the bore 124 would be substantially vertical.

The pivot axis 135 of the tail section of lure 110 has been inclined (in contrast to being perpendicular to the longitudinal axis through the body of the lure) by an angle $\phi$ to cause the attitude of the lure to be always upright (that is, with top side up and bottom side down) when the lure is pulled through water.

It has been found that a lure, such as lure 10 (shown in FIGS. 1-4 which has the axis of pivot pin 25 perpendicular to the longitudinal axis of the lure, when still in the water and in and extreme jackknife position (that is, with the rear section positioned perpendicular to the front section) will roll over onto one side as a result of the weight of the tail section being concentrated near its rear end because of the weight of fishhook 15. The weight of the fishhook 15 acting through its moment arm of length equal to the distance between the tail end 18 and pivot pin 25 will roll the front section 19 over on one side. The direction of roll will depend upon the direction in which the tail section is angled relative to the front section. For a surface lure, one that floats on the surface of the water, the lip 13 will be substantially perpendicular to the surface of the water when the front section is on its side and one side of the lip will be out of the water. In this condition for surface lures, the lure when pulled through the water, will not recover its upright position and continue articulation.

By inclining the pivot axis of the rear section relative to the front section, as has been done in lure 110, by an angle $\phi$ the rear end 118 of the tail section 120 can sink while the lure is motionless and floating on top of the water in the jackknife orientation and still the front section 119 will not be caused to roll over on its side to lift one side of the lip 113 out of the water. The side edges X and Y of the lip 113 will ideally still be submerged in water at ready position to cause articulation by the lip, the same ready orientation the lure would have if its tail section were in alignment with the front section and not jackknifed.

Stated differently, the purpose of the inclination of the pivot axis 135 by the angle $\phi$ is to essentially keep under control the working limits of the rolling action of the front section. A roll action is present on any lure or body that has a front lip (cant) to take on water forces that are substantially below the body's center of gravity. The amount of roll of the front section becomes undesirable when the lure rolls sufficiently to allow the front bottom lip 113 to function as a side cant in lieu of a bottom cant causing cessation of articulation. The lure in the side cant condition will then retrieve laying on its side without articulation. The assistance given by the inclined pivot axis (angle $\phi$) in keeping the front section bottom lip as the bottom cant at all times is effective with any conventional lure where cooperative hinging is present such that all rolling is transmitted through the hinge to the other body.

The size of angle $\phi$ is directly correlated with the rear section's unequal distribution of mass weight per unit volume, the extreme rear end being conventionally heavier because of the weight of an attached fishhook, usually one with trebble barbs. The selection of the angle $\phi$ is dependent upon how much the buoyancy angle is due to unequal mass weight per unit volume and the frequency of oscillation being different for short body lures than for longer body lures. The short body lures oscillate at a higher frequency than the long body lures.

A formula for determining the size of the angle $\phi$ is as follows:

$$\phi = b_1\phi_1 - b_2 w$$

Where:
$\phi$ = the selected angle
$b_1$ = the coefficient of the buoyancy angle
$\phi_1$ = buoyancy angle (droop angle)
$b_2$ = coefficient of the frequency of oscillation
$w$ = frequency of oscillation
Note: The oscillation frequency decreases the selected angle as the frequency increases.

The angle $\phi$ is normally selected to be within the range of from 0°–30°. A preferred angle $\phi$ is approximately 15°.

The function of the rear lip 113' is to induce rotation of the rear section 120. The magnitude of rotational force induced is greatest when the front and rear sections 119 and 120 are in alignment. The least induced force is present when the rear section has rotated to an extreme angled position. The ability of the front cup 130, which is forward of the pivot axis 135, to induce force is just the inverse of the ability of the rear lip 113' to induce force timely, that is, the rotational force induced by the cup 130 when the front and rear sections 119 and 120 are in alignment is zero, and is maximum when the front and rear sections are in non-alignment.

Figure 5:
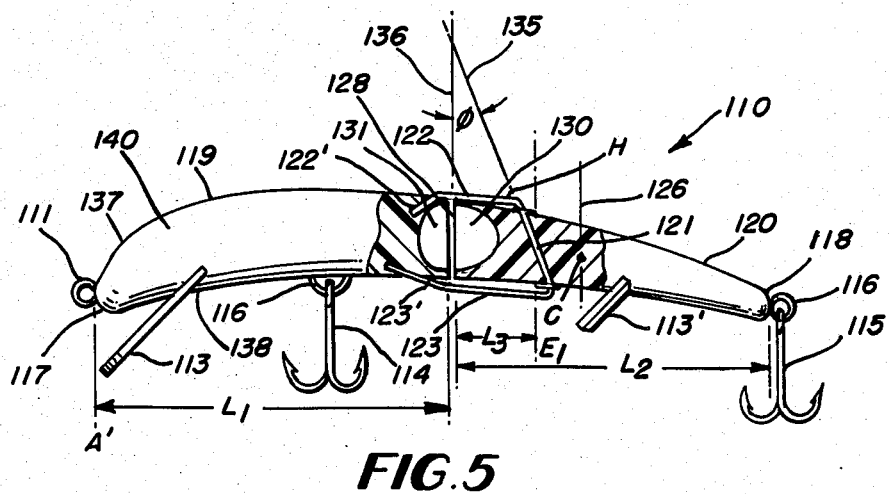
FIG. 5 is a side elevational view, partly in longitudinal section, of another embodiment of the invention.

The location of the midpoint of the pivot portion 121 in the body section 120 must be such that $L_3$, the distance between the midpoint of the pivot portion 121 and the front end of the tail section, is less than one-half of $L_2$, the length of body section as shown in FIG. 5, or the lure would lock in an extreme angled position and cease articulation.

The function of the rear lip 113' is only supplemental to the work of the front lip 113 in order to cause the cupped cavity 130 to be more fully exposed to water forces thereby yielding a greater active sweep angle of the tail section 120. The size of the rear lip 113' should be small compared to the size of the front lip 113 so that it does not unduly dominate the action of the tail section. The rear lip starts the tail section swinging from a position in alignment with the front section until the cup 130 is exposed whereupon the forces acting upon the cup become the dominant forces causing swinging motion of the tail section.

The function and characteristics of the rear lip 113' of the lure 10 shown in FIG. 10 are essentially the same as described in the preceding paragraph.

For purpose of reference, the lure 10 of FIGS. 1–4 and 10' of FIGS. 10 and 11 has a top surface 37, a bottom surface 38 and opposite side surfaces 39 and 40. The front and rear body sections 19 and 20 each have respectively top surfaces 19a and 20a, bottom surfaces 19b and 20b, and opposite side surfaces 19c, 19d and 20c, 20d.

Likewise the lure 110 of FIGS. 5–9 has a top surface 137, a bottom surface 138 and opposite side surfaces 138 and 139. The front and rear body sections 119 and 120 each have respectively top surfaces 119a and 120a, bottom surfaces 119b and 120b and opposite side surfaces 119c, 119d and 120c, 120d.

In each of the lures disclosed herein, the top, bottom and side surfaces of each of the body sections are part of the overall body surfaces of the complete lure.

While in the foregoing there have been described and shown preferred embodiments of the invention, various modifications and equivalents may be resorted to within the spirit and scope of the invention as claimed.

What is claimed is:

1. An articulated fishing lure for simulating an injured minnow when pulled through water comprising a body having a top surface, a bottom surface, opposite side surfaces and front and rear ends, means at said front end for attaching a line and means at said rear end attaching a fishhook thereto, said body being symmetrical about a longitudinal plane extending through said top and bottom surfaces and comprising a leading body section, a trailing body section and hinge means pivotally connecting said leading and trailing body sections for swinging motion relative to each other, each of said leading and trailing body sections having front and rear ends, top and bottom surfaces and opposite side surfaces, said top and bottom surfaces and said opposite side surfaces of said leading and trailing body sections being part of the corresponding surfaces of said body, said hinge means comprising upper and lower bracket arms affixed to and extending rearwardly from the rear end of said leading body section and pivot means secured to said upper and lower bracket arms rotatably mounting said trailing body section to swing freely relative to said leading body section, said upper bracket arm overlying a portion of the upper surface of the trailing body section adjacent the front end thereof and said lower bracket arm underlying a portion of the bottom surface of said trailing body section, said trailing body section having a cupped cavity extending inwardly from the front end thereof and terminating short of the centroid of said trailing body section, and said pivot means being connected to said trailing body section rearward of said cupped cavity and forward of the centroid of said trailing body section.

2. The articulated fishing lure of claim 1 wherein a first flat baffle is secured to the bottom of said leading body section adjacent the front end thereof and projects downwardly and forwardly from said bottom.

3. The articulated fishing lure of claim 2 together with a second flat baffle which is secured to the bottom of said trailing body section and projects downwardly and forwardly from said bottom.

4. The articulated fishing lure of claim 3 wherein said second baffle is of smaller size than said first baffle.

5. The articulated fishing lure of claim 1 wherein said upper and lower bracket arms are integral extensions from the rear end of said leading body section adjacent the top and bottom surfaces thereof respectively.

6. The articulated fishing lure of claim 5 wherein said pivot means comprised a pivot pin extending through said trailing body section in said longitudinal plane.

7. The articulated fishing lure of claim 6 wherein said pivot pin is perpendicular to the longitudinal axis of said body.

8. The articulated fishing lure of claim 7 wherein a first flat baffle is secured to the bottom of said leading body section adjacent the front end thereof and projects downwarly and forwardly from said bottom.

9. The articulated fishing lure of claim 8 together with a second flat baffle which is secured to the bottom of said trailing body section and projects downwardly and forwardly from said bottom.

10. The articulated fishing lure of claim 9 wherein said second baffle is of smaller size than said first baffle.

11. The articulated fishing lure of claim 1 wherein said pivot means comprises a pivot pin extending through said trailing body section in said longitudinal plane, said pivot pin being upwardly and forwardly inclined relative to a plane including the front end surface of said trailing body section by an angle ($\phi$) which is sufficient to cause said trailing body section to roll about its longitudinal axis as it swings about said pivot pin.

12. The articulated fishing lure of claim 1 wherein the angle ($\phi$) is approximately 15°.

13. The articulated fishing lure of claim 11 wherein said upper and lower bracket arms and said pivot pin are integral parts of a bent wire rod having upper and lower opposite end portions which are secured in said leading body section adjacent the rear end thereof, said upper end portion entering said leading body section from the top surface thereof while the lower end portion enters said leading body section from the bottom surface thereof, said upper and lower bracket arms being rearward and substantially parallel extensions of said upper and lower end portions respectively and said pivot pin integrally joining the rearward ends of said upper and lower bracket arms.

* * * * *